United States Patent
Dickison et al.

[11] Patent Number: 6,116,266
[45] Date of Patent: Sep. 12, 2000

[54] LIQUID COLLECTION TRAY

[75] Inventors: Max Dickison; Anthony Kearney, both of Adelaide; David Pullman, Hyde Park, all of Australia

[73] Assignee: Retriever Products Pty. Ltd., Australia

[21] Appl. No.: 09/193,590

[22] Filed: Nov. 17, 1998

[30]   Foreign Application Priority Data

Nov. 17, 1997 [AU]  Australia ................................ PP 0417

[51] Int. Cl.[7] ................................................. F16K 23/00
[52] U.S. Cl. ..................... 137/312; 137/571; 137/574; 137/565.37
[58] Field of Search .................... 137/312, 517, 137/574, 565.37

[56]   References Cited

U.S. PATENT DOCUMENTS

| | | |
|---|---|---|
| 4,903,723 | 2/1990 | Sublett .................................... 137/312 |
| 5,099,873 | 3/1992 | Sanchez . |
| 5,301,722 | 4/1994 | Todd et al. ................................ 141/86 |
| 5,429,274 | 7/1995 | Vlaskamp ................................ 222/108 |
| 5,454,960 | 10/1995 | Newsom .................................. 210/805 |
| 5,620,018 | 4/1997 | Carpenter et al. ...................... 137/312 |
| 5,645,103 | 7/1997 | Whittaker ................................ 137/312 |
| 5,775,869 | 7/1998 | Bishop .................................... 414/608 |
| 5,883,300 | 3/1999 | Johnson ..................................... 73/40 |

*Primary Examiner*—A. Michael Chambers
*Assistant Examiner*—Thomas L. McShane
*Attorney, Agent, or Firm*—Brown, Martins, Haller & McClain, LLP

[57]   ABSTRACT

An improved open topped vessel (10) for receiving and containing a liquid, substantially made from plastics, comprises a housing having an upper wall (11) defining a catchment area with a well (17) at its lowermost point; a sump (19) remote from the well (17); and a pipe (18) connecting the well (17) to the sump (19). The vessel (10) is constructed so that thermal expression of the upper wall (11) and causes controlled downward movement of the well (11) without resulting in low point liquid traps.

13 Claims, 4 Drawing Sheets

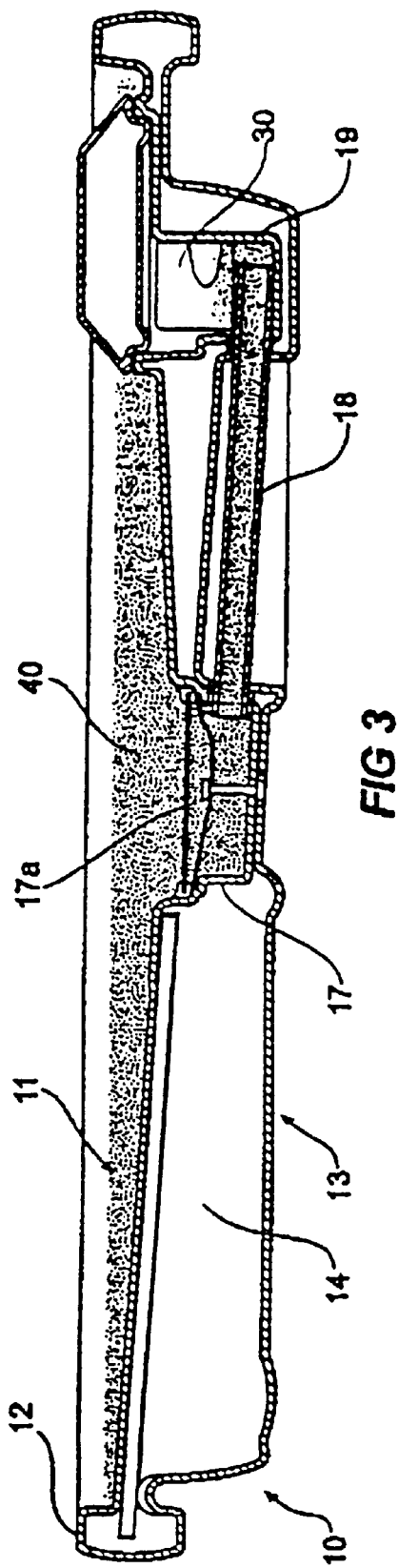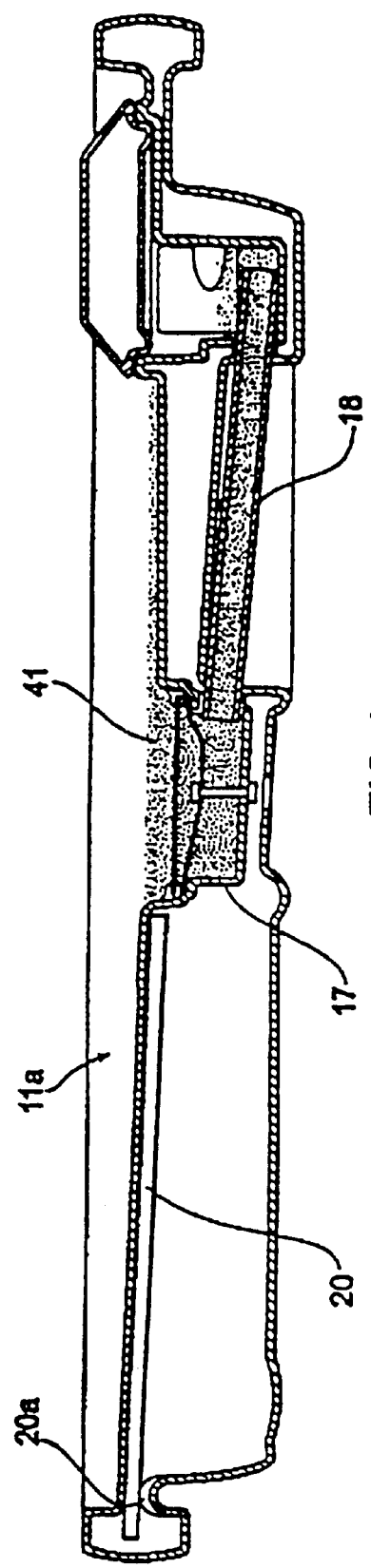

LIQUID COLLECTION TRAY

The present invention relates to liquid collection trays and in particular to collection trays for automotive waste liquids such as engine coolant.

BACKGROUND

The process of collection and disposal of waste liquids which are drained under gravity from tanks, or other liquid filled spaces, presents a number of problems. These problems are exacerbated when the flow of liquids under gravity is unpredictable and messy, for instance when engine coolant is drained from vehicle cooling systems.

Current methods of collecting waste liquids include the use of trays placed under the source of waste liquid flow, followed by relocation of the trays for disposal of the waste liquids. For ease of description, the problems that arise with this and other known forms of collection of drained waste liquids will now be described in relation to a specific application in the automotive industry.

Modern automotive cooling systems frequently use corrosion inhibitors containing compounds such as ethyl glycol which have a limited lifespan and therefore need changing frequently. This involves draining the radiator and refilling it with fresh coolant. In a typical automotive workshop, coolant is also drained when components such as radiators, radiator hoses, and water pumps require servicing.

Coolant is usually drained from the vehicle by removing the radiator drain plug, radiator hose or engine plug. During this process the coolant tends to run onto chassis and suspension components creating spillage and mess on the floor. This situation frequently results in coolant being discarded directly into workshop sumps or the nearest drain, where it eventually ends up in the storm water or sewerage system. This is both illegal and environmentally unacceptable because both ethyl glycol and residual heavy metals from inside the engine enter the storm water or sewerage systems.

The spillage onto the workshop flow also creates hazardous slippery conditions for workshop staff.

In an attempt to ameliorate these problems some workshops do use a catchment tray, usually of a makeshift nature, fabricated from folded sheet metal. However once full, these trays are very difficult to move without spillage and it is also extremely awkward to transfer their contents into a separate container for recycling. Furthermore, these trays tend to lack durability and are easily bent out of shape. Users of these catchment trays often drain them directly into workshop sumps or drains.

It is therefore an object of the present invention to provide a product which, to a least some extent, solves the aforementioned problems or at least provides the public with a useful choice.

It is a further object of the present invention to provide a product which is easy to handle and store.

SUMMARY OF THE INVENTION

According to the present invention, there is provided an open topped liquid collection vessel,
substantially made from plastic, for receiving and containing a liquid, comprising:
an upper wall defining a catchment area and having a well at its lowermost point;
a sump remote from said well;
a conduit connecting said well to said sump.

Preferably the upper wall is constructed from flexible plastics material and is only supported at its perimeter, thereby enabling it to deflect in the centre region thereof wherein the well is located.

Preferably the improved liquid collection tray further comprises a pump, the inlet of which is located towards the lowermost point of the sump.

To provide a more controlled flexing of the upper wall of the vessel under the weight of the liquid within the vessel and its well, flexible reinforcement rods connected to the upper wall are provided.

Preferably the conduit is a pipe which enters the sump through a side wall thereof.

To allow the improved liquid collection tray to be easily stored vertically without damage or mess, the pipe outlet within the sump is laterally displaced from the side of the sump from which it enters so that as the improved liquid collection tray is tilted upwards in a direction raising the pipe outlet, the side of the sump becomes the lowermost area of the sump, thereby trapping any residual liquid and preventing it re-entering the pipe and back-flowing into the well.

According to a second aspect of the present invention, there is provided an open topped liquid collection vessel comprising:
an upper wall defining a catchment area;
a cavity below said upper wall; and
a pump having an inlet communicating with said catchment area and an outlet communicating with a retractable hose characterised in that said hose is stowable within said cavity for storage.

Preferably the hose has an outlet incorporating a valve in the form of a triggered nozzle and the pump is driven by an electric motor with a power cable extendible from within the vessel for easy connection to a vehicle battery.

A specific embodiment of the invention will now be described in some further detail with reference to and as illustrated in the accompanying figures. This embodiment is illustrative, and is not meant to be restrictive of the scope of the invention.

DETAILED DESCRIPTION OF AN EMBODIMENT OF THE INVENTION an embodiment of the invention is illustrated in the accompanying representations in which:

FIG. 3 shows a cross-sectional view of the tray assembly substantially filled with liquid;

FIG. 4 shows a cross-sectional view of the tray partially filled with liquid;

Figure 1:
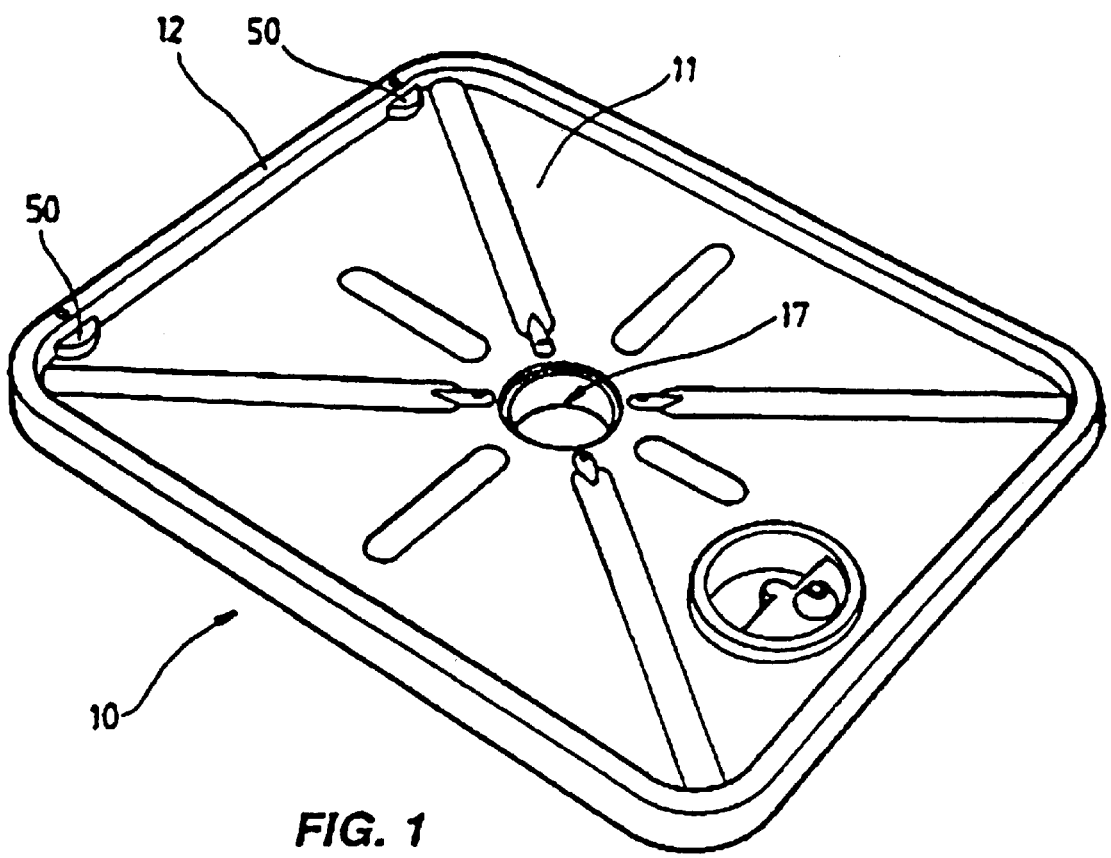
FIG. 1 shows a liquid collection tray moulding according to the invention from above in perspective view.
Figure 2:
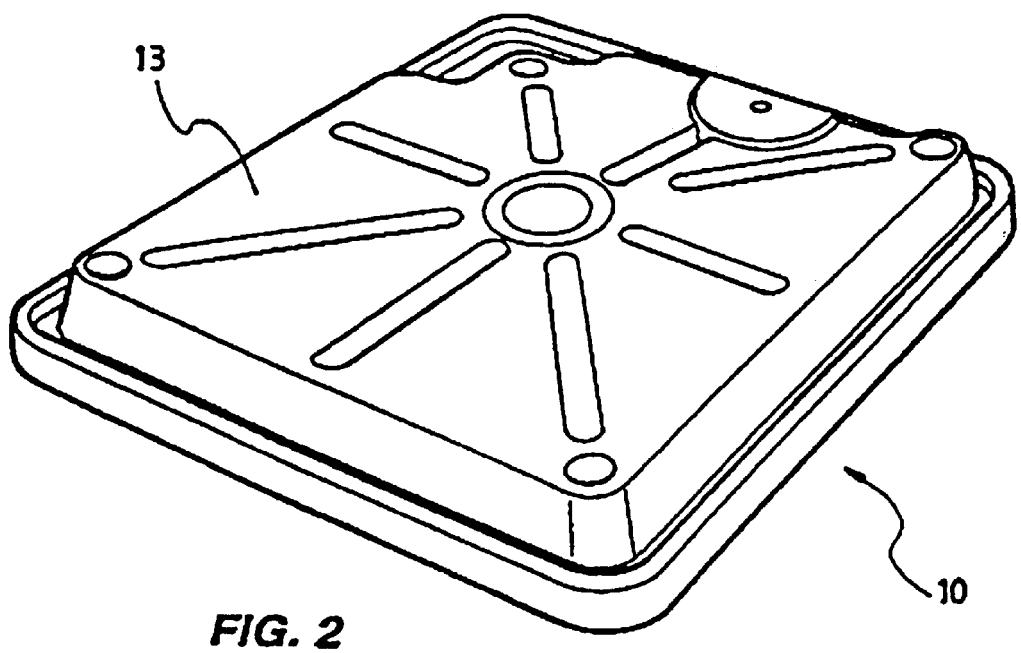
FIG. 2 shows the tray moulding from below in perspective view.

In the embodiment shown in FIGS. 1 to 6, an improved liquid collection tray 10 comprises a flexible sloping upper wall 11 having a draining surface with a centrally located well 17, a remote sump 19 and a conduit in the form of a pipe 18 connecting the well 17 to the sump 19.

FIGS. 3 and 4 show a cross-sectional view of a large flat hollow moulding of polypropylene which forms the upper wall 11, with integral well 17, rim 12 and bottom wall panel 13 which closes off cavity 14. The upper wall 11 is supported around its edges by rim 12 which doubles as a continuous handle, the formed profile providing a handle for positioning and carrying the tray. Polypropylene is used for its impact strength, high chemical and temperature resistance and its ability to be eventually recycles.

The rim 12 combined with the slightly dished upper wall 11 forms a large catchment area. At the lowest point of the draining surface of the upper wall 11 is a well 17. Well 17 is covered by filter 17a and is plumbed to a remote sump 19 by a conduit in the form of a pipe 18. The filter well 17 and pump sump 19 are both localised depressions or pockets in the upper wall 11. The wall 11, with its well 17 and sump 19, is effectively suspended from the outer rim 12 and the inner portion 11a of the wall 11 is free to move up and down depending on the volume and temperatures of liquid it contains. When the draining surface of the upper wall 11 is full of liquid the inner portion 11a is deflected downwards by the weight of the liquid producing a dishing effect which increases the fall angle to the well 17. In addition to the weight effect, a relatively small amount of hot coolant is enough to cause expansion of the upper wall 11 and to thereby also produce a dishing effect. FIG. 3 shows this dishing effect with the inner portion of the tray 11a and the well 17 in their lowest positions. To ensure the upper wall 11 is kept free from distortion (from heat) and to assist in controlling dishing, flexible reinforcing rods 20 are located under the upper wall 11. These reinforcing rods 20 span from the well 17 out to the corners of the tray at the rim 12. One end of each rod 20 is fixed to the upper wall 11 adjacent to the well 17 and the other end is free to slide in a moulded cradle 20a at the rim 12 (refer FIG. 4). This allows the upper wall 11 to move together with the rod, even when the wall surface is affected by hot liquids causing differential expansion between the rods and the draining surface of upper wall 11.

The reinforcement rods 20 provide a controlled dynamic draining surface which optimises the fall angle to the well 17 and prevents the formation of low point liquid trays.

Figure 5:
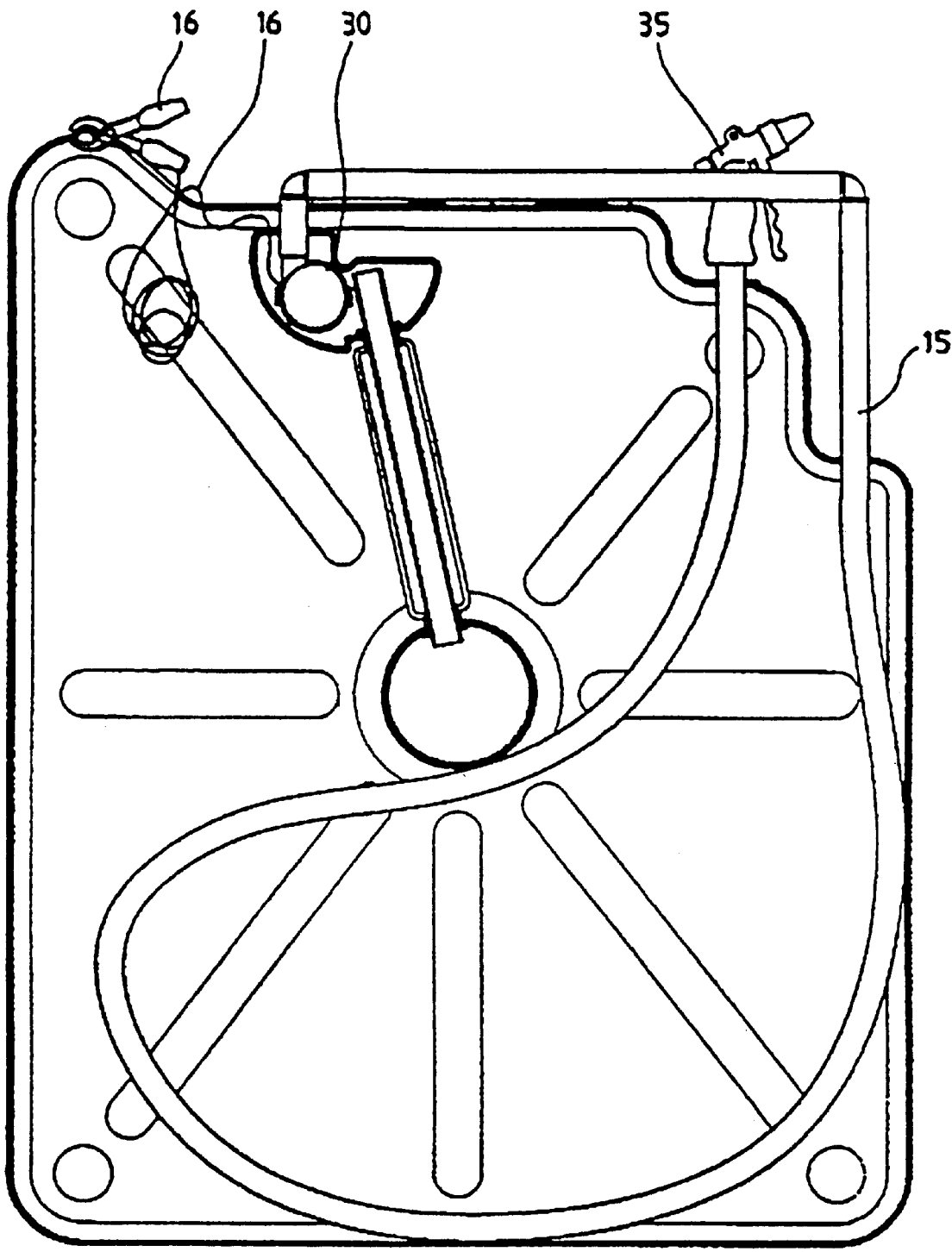
FIG. 5 shows a cross-sectional view of the tray below the draining surface.

FIG. 3 shows a cross-sectional view of the tray substantially filled with liquid. The surface level of the liquid is shown at 40. In this full condition the weight of the liquid on the draining surface causes maximum dishing as described above. As the liquid drains away from the surface via the well 17 to the sump 19 the weight of the liquid on the draining surface decreases allowing the inner portion of the tray 11a and the well 17 to rise. This then provides a greater fall angle between the well 17 and the sump 19. This greater fall angle ensures that all of the liquid that falls on the catchment area of the draining surface is effectively drained from the well 17 via pipe 18 to the sump 19. Pump 30 pumps the liquid from sump 19 via a retractable hose 15 (shown in FIG. 5) to any convenient container or discharge point. At the end of hose 15 is valved outlet in the form of a triggered hand piece nozzle 35. The routing of retractable hose 15 from pump 30 is triggered hand piece nozzle 35 is through cavity 14 as shown in FIG. 5 thereby enabling convenient storage of hose 15.

Figure 6:
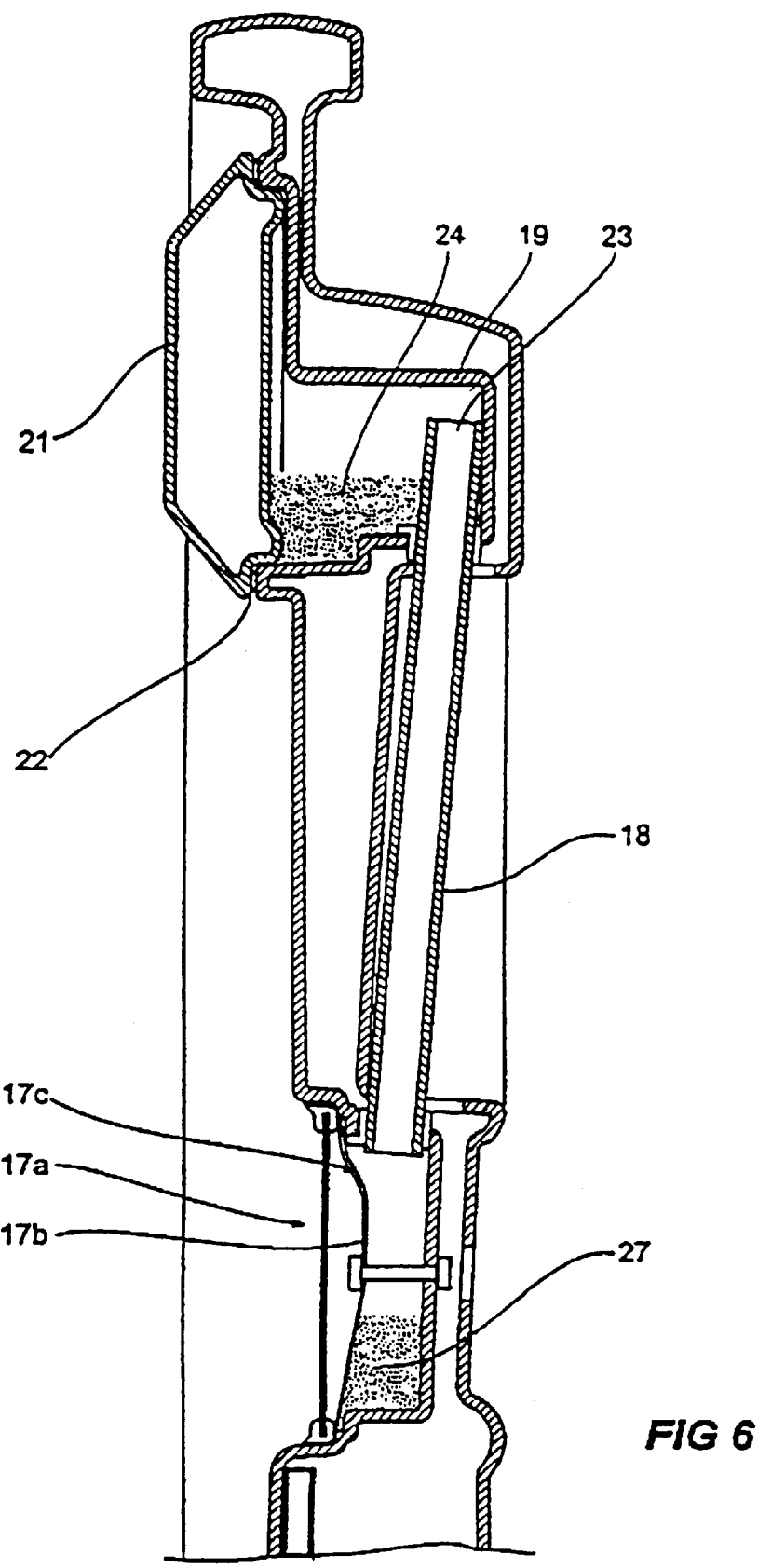
FIG. 6 shows a part cross-sectional view of the tray in its upright stored position.

The liquid collection tray 10 has been designed to be stored on its edge. In this orientation, the sump 19 is located at the top of the liquid collection tray 10 as shown in FIG. 6. In this position there is easy access to the triggered hand piece 35 and retractable hose 15 and electrical leads 16 and associated clips 16a.

FIG. 6 shows the sump 19 sealed with a cap 21 and a seal 22 to prevent liquid draining from the sump 19 back onto the upper wall 11. Pipe 18 terminates at pipe outlet 23 at an elevated position within sump 19 so that any residual liquid 24 that may be present within sump 19 cannot run back to the well 17.

The well 17 has a spill container baffle 17b which is sealed to the well 17 around its rim. Baffle 17b has a hole 17c orientation such that it will allow liquid to drain through it when the liquid collection tray 10 is in its normal operating mode but will trap residual liquid 27 as shown in FIG. 6 thereby preventing spillage in the stored position.

The liquid collection tray 10 is relatively shallow, has a convenient rim 12 and therefore can be easily slid under the engine bay of a vehicle. Two wheels are located on one edge of the liquid collection tray 10 to enable the unit to be moved easily. Two wheel cavities 50 are provided to house the wheels as shown in FIG. 1.

Use of the liquid collection tray 10 to capture coolant from the engine and radiator of a vehicle will now be described. Firstly the liquid collection tray 10 is slid under the engine bay of the vehicle. The coolant is then drained from the engine or radiator onto the draining surface of upper wall 11. The draining surface is sized to hold the full coolant capacity for most engines. This liquid then drain to wall 17 assisted by the flexing downwards of the inner portion of the tray 11a and the well 17 as described previously. Liquid then flows through pipe 18 and into sump 19 and can then be pumped via an internal pump 30 through hose 15 to triggered hard piece nozzle 35. The pump 30 is driven by a low voltage DC (Direct Current) motor and has a retractable power cable 16 with a switch and two battery clips 16a which clip directly to the 12 volt battery of a vehicle.

By switching on the pump 30 and triggering hand piece nozzle 35 liquid (usually engine coolant) can be drained off into a suitable storage drum or recycling container. By emptying the liquid collection tray while it is still under the vehicle the possibility of spillage caused by moving a full liquid receptacle is eliminated. In some instances, the coolant can be immediately reused, for example, in the case where repairs have been carried out on the cooling system but the coolant is not due for replacement.

When not in use, the hose 15 and power cables 16 simply retract back with in the liquid collection tray 10 as best seen in FIG. 5. The liquid collection tray 10 can then be easily tilted onto its side and then rolled to a convenient storage location on the small wheels located on its side (as described previously).

In an alternative embodiment of the invention, the pump is connected directly to the well obviating the need for a remote sump.

While the present invention has been described in terms of a preferred embodiment in order to facilitate better understanding of the invention, it should be appreciated that various modifications can be made without departing from the principles of the invention. Therefore, the invention should be understood to include all such modifications within its scope.

What is claimed is:

1. An open topped liquid collection vessel, substantially made from molded plastic, for receiving and containing a liquid, comprising:

an upper wall defining a catchment area and having a well at its lowermost point;

a sump having a small liquid containing capacity relative to the liquid containing capacity of said catchment area and positioned remote from said well wholly below said catchment area; and a conduit connecting said well to said sump.

2. An open topped vessel according to claim 1 wherein said upper wall is primarily supported at or near its periphery so that the central region of said upper wall deflects downwards under the weight of a liquid on its surface thereby increasing the fall towards said well.

3. An open topped vessel according to claim 1 further comprising means for controlling the thermal expansion of said upper wall so that downward movement of said well due to thermal expansion occurs without resulting in low point liquid traps.

4. An open topped vessel according to claim 3 wherein said means comprises a plurality of rods extending radially away from said well towards said periphery, each said rod being fixed at one end to said upper wall and slidably supported at its other end.

5. An open topped vessel according to claim 4 further comprises a filter covering said well.

6. An open topped vessel according to claim 5 further comprising a baffle below said filter, said baffle arranged to create a trap for containing liquid so that as said vessel is tilted upwards in a direction raising the outlet of said conduit, said trap traps any residual liquid and prevents its escaping from said well.

7. An open topped vessel according to claim 1 wherein said conduit has an outlet which is laterally displaced inwards from the side of said sump from which it enters so that as said vessel is tilted upwards in a direction raising said conduit outlet, said sump side becomes the lowermost area of said sump, thereby trapping any residual liquid and preventing it back-flowing into said well.

8. An open topped liquid collection vessel comprising;

a housing having an upper wall defining a catchment area and having a well at its lowermost point;

a sump having a small liquid containing capacity relative to the liquid containing capacity of said catchment area and positioned remote from said well wholly below said catchment area;

a conduit connecting said well to said sump;

a cavity below said upper wall; and a pump having an inlet communicating with said sump and an outlet communicating with a retractable hose characterized in that said hose is stowable within said cavity for storage.

9. An open topped vessel according to claim 8 wherein said hose has an outlet nozzle incorporating a valve.

10. An open topped vessel according to claim 9 wherein said pump is driven by a low voltage DC electric motor.

11. An open topped vessel according to claim 10 further comprising a retractable power cable connected to said motor, said cable being extendible from within said cavity when in use and is stowable within said cavity for storage.

12. An open topped vessel according to claim 8 further comprising at least one ground engageable wheel mounted for rotation to a side wall of said housing and arranged to roll along the ground when said vessel is rotated through ninety degrees onto the side on which said at least one wheel is mounted.

13. An open topped vessel according to claim 11 further comprising at least one ground engageable wheel mounted for rotation to a side wall of said housing and arranged to roll along the ground when said vessel is rotated through ninety degrees onto the side on which said at least one wheel is mounted.

* * * * *